Patented Sept. 16, 1924.

1,509,082

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

IMPERISHABLE BUTTER.

No Drawing.   Application filed November 2, 1922.   Serial No. 598,511.

*To all whom it may concern:*

Be it known that I, CHARLES E. NORTH, a citizen of the United States of America, residing at Montclair, in the county of Essex and State of New Jersey, have invented certain new and useful Improvements in Imperishable Butter, of which the following is a full, clear, and exact description.

It is estimated that 50% of commercial butter produced for the market decomposes, more or less, before it reaches the consumer. This decomposition is due to the action of microscopic organisms on certain of the organic constituents of the butter, such as the casein or curd, and the milk sugar, for ordinary unsalted butter contains, approximately, 84% fat, 14½% water, .85% casein or curd, .2% ash, .3% milk sugar and .15% lactic acid. The water furnishes moisture and the curd, milk sugar and ash furnish food for the bacteria of decomposition which convert the milk sugar into lactic acid and putrefy the curd.

Both the lactic acid and the other products of decomposition act upon the more delicate portions of the milk fat and cause rancidity, and since, therefore, it is a fact that the deterioration or decomposition of butter begins with the action of bacteria, not on the fat itself, but on the solids other than fat it follows that if it were possible to produce butter which contains no milk solids not fat, such as casein, milk sugar and ash, a great contribution would be made to the milk industry since such a product would contain nothing for the bacteria of decomposition to feed or act upon and the butter would be capable of indefinite preservation in a pure and edible condition.

The presence of curd and milk sugar in butter is not necessary to the integrity of that product, and in fact, their presence is a constant menace to its food value, while from a public health standpoint these ingredients must be regarded as a distinct source of danger. It is these ingredients that encourage the development not only of the bacteria of filth and decomposition, but such as breed disease and may have existed in the original milk from which the butter was produced. Hence, from every point of view, both for the integrity of the butter and the health of the consumer, the presence of casein and milk sugar in butter must be looked upon as distinctly undesirable.

In the butter industry the presence of curd in the butter is looked upon as a physical necessity, chiefly because of the part that it plays in the composition of ordinary cream from which the butter is made and the part which it also plays in the making of butter from cream, in the production of a proper grain in the body of the product. It is also believed that the curd, the milk sugar and other nonfat solids play some part in the flavor of the butter.

Butter manufacture and consumption, however, are largely acquired habits. The food value of butter resides primarily in the presence of the milk fat and there is no real reason why this fat should be produced and sold only in the form of the ordinary marketable butter. All ingredients, with the exception of the fat, are present in such minute quantities that their presence cannot be justified on the ground that their contribution to its food value is a matter of moment or vital importance.

Milk fat may be produced in a form generally similar to butter but without the products of decomposition above referred to and without the characteristic grain of good butter. To produce such fat with a grain it must first be brought into the form of an emulsion as it is in cream. If this be done then proper churning of the emulsion results in the assembling of the independent fat globules in clusters and the clusters into larger lumps of fat, giving rise to the apparent granular condition characteristic of good butter.

In carrying out the invention therefor, upon which is based this application for Letters Patent I proceed as follows. I take pure milk oil or fat and make it into an emulsion with water by the use of a suitable thickener which takes the place of the nonfat solids of ordinary milk or cream. Such a thickener as gum arabic or agar or gelatin will very perfectly fulfill this purpose and if the emulsion, produced in the ordinary and well known way, be churned a butter will be produced which contains a good grain and in which the proportion of milk fat present corresponds to that found in ordinary butter. The only other ingredients, however, are water and the thickener.

Agar, for example, a very good substance to use as a thickener, is not decomposed by the action of lactic acid bacteria nor by that of putrefying bacteria, hence butter made by my process with this ingredient is not liable to decomposition since it contains nothing by which such bacteria can be developed.

In practice I have churned an emulsion of milk fat containing 30% of fat, ½% agar and 69½% of water. This has resulted in the production of what may be termed an agar butter, in which the fat globules are assembled in clusters forming a good grain. The agar forms a jelly which with the percentage of water commonly found in butter fills in the spaces between such clusters of fat globules. This product will remain sweet and free from rancidity for an indefinite period, and if protected from the air it will not oxidize. It may be unsalted and used as sweet butter or salted as butter more usually is.

It will now be seen that the possibility of producing a nondecomposable or imperishable butter did not exist until processes had been discovered for obtaining pure milk fat or oil and for producing therefrom an emulsion with water and a suitable non-decomposing thickener. From this imitation cream free from all of the nonfat solids characteristic of ordinary milk and cream the butter may be produced by churning. The product is therefore not only most desirable for all the reasons above stated or implied but because of its keeping qualities, its cheapness and its food value.

What I claim as my invention is:

1. The process herein described of making imperishable butter which consists in emulsifying pure milk oil, water and a non-decomposable thickener in the relative proportions in which the corresponding ingredents are present in natural creams and churning this product to produce the butter.

2. An imperishable butter composed of pure milk oil, water and a non-decomposable emulsifying agent, these ingredients in the order named being in substantially the same relative proportions as the corresponding ingredients, the fat, water, and non-fat solids present in the product imitated.

In testimony whereof I hereto affix my signature.

CHARLES E. NORTH.